US012361201B2

(12) United States Patent
Choubey et al.

(10) Patent No.: US 12,361,201 B2
(45) Date of Patent: Jul. 15, 2025

(54) SYSTEMS AND METHODS FOR PARAMETER ENSEMBLING FOR REDUCING HALLUCINATION IN ABSTRACTIVE SUMMARIZATION

(71) Applicant: Salesforce, Inc., San Francisco, CA (US)

(72) Inventors: Prafulla Kumar Choubey, San Jose, CA (US); Alexander R. Fabbri, San Francisco, CA (US); Jesse Vig, Los Altos, CA (US); Chien-Sheng Wu, Mountain View, CA (US); Wenhao Liu, Redwood City, CA (US); Nazneen Rajani, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 363 days.

(21) Appl. No.: 17/880,502

(22) Filed: Aug. 3, 2022

(65) Prior Publication Data

US 2023/0376677 A1 Nov. 23, 2023

Related U.S. Application Data

(60) Provisional application No. 63/343,849, filed on May 19, 2022.

(51) Int. Cl.
*G06F 40/166* (2020.01)
*G06N 20/00* (2019.01)

(52) U.S. Cl.
CPC .......... *G06F 40/166* (2020.01); *G06N 20/00* (2019.01)

(58) Field of Classification Search
None
See application file for complete search history.

(56) References Cited

U.S. PATENT DOCUMENTS

2022/0180627 A1\* 6/2022 Zhao ................... G06F 18/2148
2024/0054349 A1\* 2/2024 Tai ........................... G06N 3/09

OTHER PUBLICATIONS

Goyal, Tanya et al. "Annotating and Modeling Fine-Grained Factuality in Summarization." Apr. 9, 2021. https://arxiv.org/pdf/2104.04302. Accessed Sep. 23, 2024. (Year: 2021).\*
Pavel Izmailov et al., "Averaging Weights Leads to Wider Optima and Better Generalization", arXiv:1803.05407, 12 pages, Feb. 25, 2019.

(Continued)

*Primary Examiner* — Paras D Shah
*Assistant Examiner* — Jon Christopher Meis
(74) *Attorney, Agent, or Firm* — Haynes and Boone, LLP

(57) ABSTRACT

Embodiments described herein provide a document summarization framework that employs an ensemble of summarization models, each of which is a modified version of a base summarization model to control hallucination. For example, a base summarization model may first be trained on a full training data set. The trained base summarization model is then fine-tuned using a first filtered subset of the training data which contains noisy data, resulting in an "anti-expert" model. The parameters of the anti-expert model are subtracted from the parameters of the trained base model to produce a final summarization model which yields robust factual performance.

20 Claims, 13 Drawing Sheets

(56) References Cited

OTHER PUBLICATIONS

Jonathan Frankle, et al., "Linear Mode Connectivity and the Lottery Ticket Hypothesis", arXiv:1912.05671, 30 pages, Jul. 18, 2020.
Behname Neyshabur, et al., "What is being transferred in transfer learning?", arXiv:2008.11687, 34 pages, Aug. 26, 2020.
Mitchel Wortsman, et al., "Robust fine-tuning of zero-shot models", arXiv:2109.01903, 45 pages, Sep. 4, 2021.

* cited by examiner

| Model | R-1 | R-2 | R-L | E-R$_{ref}$ |
|---|---|---|---|---|
| All | 45.70 | 22.53 | 37.54 | 53.69 |
| Filtered | 41.66 | 18.39 | 33.66 | 42.58 |
| Δ | -8.84% | -18.37% | -10.33% | -20.69% |

FIG. 5

| Model | $D_{arc}$ | $D_{sum}$ | $E\_P_{src}$ | $E\_R_{ref}$ | QEval | BS-P | BS-R | R1 | R2 | RL | TT | IT |
|---|---|---|---|---|---|---|---|---|---|---|---|---|
| XSUM | | | | | | | | | | | | |
| Base | 76.16 | 34.75 | 63.82 | 53.66 | 36.54 | 88.93 | 79.86 | 45.34 | 22.21 | 37.13 | 1x | 1x |
| Ensemble | 75.22 | 33.48 | 62.63 | 54.23 | 36.37 | 88.82 | 79.86 | 45.27 | 22.28 | 37.09 | 1.2x | 1x |
| PP | 75.65 | 33.67 | 62.36 | 53.93 | 36.37 | 88.88 | 79.84 | 45.34 | 22.30 | 37.18 | 2-3x | 2x |
| PP-Clean | 79.41 | 40.09 | 72.98 | 45.72 | 37.01 | 89.09 | 79.84 | 43.82 | 20.4 | 35.89 | 1.5x | 2x |
| PP-CC | 76.88 | 35.99 | 66.06 | 52.23 | 36.62 | 88.95 | 79.85 | 45.03 | 21.87 | 36.89 | - | 2x |
| CaPE$_{DD}$ | 78.48 | 39.14 | 65.52 | 53.0 | 36.90 | 89.06 | 79.83 | 45.32 | 22.26 | 37.22 | 1.07x | 1x |
| CaPE$_{PP}$ | 78.46 | 39.13 | 69.12 | 53.36 | 37.09 | 89.07 | 79.89 | 45.16 | 21.91 | 36.94 | 1.08x | 1x |
| CaPE$_{DP}$ | 79.61 | 40.55 | 68.24 | 53.91 | 37.22 | 89.15 | 79.89 | 45.14 | 21.97 | 36.92 | 1.07x | 1x |
| CaPE$_{PD}$ | 77.88 | 38.77 | 66.08 | 52.55 | 36.84 | 89.03 | 79.82 | 45.29 | 22.21 | 37.14 | 1.08x | 1x |
| CaPE$_{DP}$* | 83.87 | 48.78 | 74.3 | 52.34 | 38.05 | 89.41 | 79.93 | 43.56 | 20.39 | 35.46 | 1.07x | 1x |
| CNN/DM | | | | | | | | | | | | |
| Base | 96.26 | 75.0 | 98.44 | 58.92 | 59.24 | 93.26 | 82.62 | 44.05 | 21.07 | 40.86 | 1x | 1x |
| Ensemble | 95.19 | 67.44 | 97.72 | 61.93 | 59.51 | 93.06 | 82.91 | 44.28 | 21.23 | 40.88 | 1.2x | 1x |
| PP | 96.14 | 74.70 | 98.26 | 58.40 | 59.15 | 93.23 | 82.58 | 43.95 | 20.94 | 40.76 | 2-3x | 2x |
| PP-Clean | 96.17 | 74.77 | 98.63 | 58.20 | 59.16 | 93.23 | 82.59 | 43.92 | 20.92 | 40.74 | 2x | 2x |
| PP-CC | 95.72 | 72.63 | 98.52 | 58.57 | 59.11 | 93.22 | 82.61 | 43.97 | 20.98 | 40.79 | - | 2x |
| CaPE$_{DD}$ | 98.27 | 86.83 | 98.89 | 58.32 | 60.10 | 93.79 | 82.85 | 43.72 | 20.80 | 40.29 | 1.14x | 1x |
| CaPE$_{PP}$ | 97.17 | 80.46 | 99.16 | 58.66 | 59.65 | 93.52 | 82.71 | 43.62 | 20.72 | 40.33 | 1.14x | 1x |
| CaPE$_{DP}$ | 97.59 | 83.04 | 98.86 | 58.86 | 59.7 | 93.56 | 82.78 | 43.71 | 20.80 | 40.42 | 1.06x | 1x |
| CaPE$_{PD}$ | 96.98 | 79.30 | 98.67 | 58.69 | 59.61 | 93.45 | 82.69 | 44.03 | 21.09 | 40.80 | 1.14x | 1x |

FIG. 6

| Model | XSUM | | CNN/DM | |
|---|---|---|---|---|
| | MNLI | QAFactEval | MNLI | QAFactEval |
| Base | 22.70 | 2.104 | 84.20 | 4.550 |
| PP-Clean | 22.30 | 2.098 | 84.40 | 4.544 |
| CaPE$_{DP}$ | 23.10 | 2.205 | 86.80 | 4.602 |

FIG. 7

| Model | $D_{arc}$ | $D_{sum}$ | $E\text{-}P_{src}$ | $E\text{-}R_{ref}$ | R1 |
|---|---|---|---|---|---|
| XSUM ||||||
| Base | 76.16 | 34.75 | 63.82 | 53.66 | 45.34 |
| $Exp_{DAE}$ | 82.09 | 41.35 | 67.73 | 53.04 | 44.79 |
| $Anti_{DAE}$ | <u>69.21</u> | <u>17.52</u> | 58.63 | 56.95 | <u>42.97</u> |
| $Exp_{E\text{-}P}$ | 78.81 | 36.42 | 69.81 | 51.60 | 44.53 |
| $Anti_{E\text{-}P}$ | 74.03 | 28.74 | <u>57.15</u> | <u>50.58</u> | 44.23 |
| CNN/DM ||||||
| Base | 96.26 | 75.0 | 98.44 | <u>58.92</u> | 44.05 |
| $Exp_{DAE}$ | 97.50 | 80.40 | 98.30 | 60.42 | <u>44.04</u> |
| $Anti_{DAE}$ | <u>89.61</u> | <u>42.75</u> | 96.69 | 62.14 | 44.07 |
| $Exp_{E\text{-}P}$ | 95.31 | 68.16 | 98.40 | 60.9 | 44.57 |
| $Anti_{E\text{-}P}$ | 93.48 | 57.85 | <u>95.46</u> | 60.13 | 44.27 |

FIG. 8

| Data | All | Exp$_{E-P}$ | Anti$_{E-P}$ | Exp$_{DAE}$ | Anti$_{DAE}$ |
|---|---|---|---|---|---|
| XSUM | 21.09 | 20.25 | 19.89 | 20.22 | 23.49 |
| CNN/DM | 51.57 | 48.4 | 51.07 | 52.79 | 50.27 |

FIG. 10

SYSTEMS AND METHODS FOR PARAMETER ENSEMBLING FOR REDUCING HALLUCINATION IN ABSTRACTIVE SUMMARIZATION

CROSS REFERENCES

The instant application is a nonprovisional of and claims priority under 35 U.S.C. 119 to U.S. Provisional Application No. 63/343,849, filed May 19, 2022, which is hereby expressly incorporated by reference herein in its entirety.

TECHNICAL FIELD

The embodiments relate generally to natural language processing, machine learning systems, and document summarization, and more specifically to systems and methods for controlling hallucinations in abstractive summarization with enhanced accuracy.

BACKGROUND

Abstractive summarization models comprehend the most important information in a document and generate natural language summaries that include words/phrases that are not necessarily copied (extracted) from that document. Prior approaches of abstractive summarization systems tend to hallucinate (e.g., generating false information in the resulting abstract) at a high frequency.

Neural abstractive text summarization systems provide models which generate a summary based on an input and are trained on training data which may include documents and corresponding summaries. The degree of hallucination in a summary generated by a neural abstractive summarization model may be a result of factual errors in the training data. Creating perfectly clean training datasets is time-inefficient, and costly. Therefore, there is a need for improved systems and methods which produce abstractive summarizations with reduced hallucinations.

BRIEF DESCRIPTION OF THE DRAWINGS

FIGS. 5-8 provide example tables illustrating example performance of different summarization models discussed herein.

FIG. 10 provides a table illustrating average summary lengths of the training dataset for expert and anti-expert models.

Figure 1:
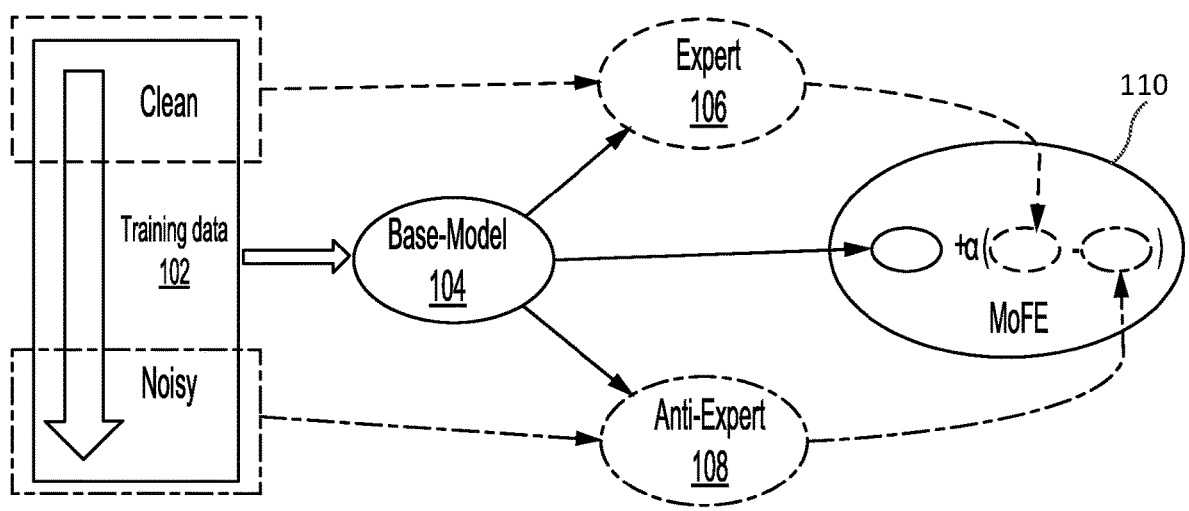
FIG. 1 is a simplified diagram showing a training method for document summarization according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Hallucination, e.g., false information, is a common issue for neural abstractive summarization models. Prior approaches of abstractive summarization systems tend to hallucinate information at a high frequency. Such hallucinations may broadly be classified as (i) extrinsic, when a model adds false information that is not present in the source document, or (ii) intrinsic, when the model distorts information present in the source document into a factually incorrect representation. The degree of hallucination may depend on the errors (noise) in the training data used to train the abstractive summarization model. Given the association between training data quality and hallucinations in resulting models, a straightforward way to reduce hallucinations is to remove noisy samples from the training data. However, removing all noisy samples can reduce the size and diversity of training data because even the noisy samples might also include useful task-specific knowledge. This impacts other aspects of generated summaries such as information recall or fluency.

In view of the need to reduce hallucination in abstractive summary models while retaining knowledge from the size and diversity of training data, embodiments described herein provide a document summarization framework, referred to as Contrastive Parameter Ensembling (CaPE), that ensembles parameters from a base summarization model, an expert summarization model, and an anti-expert summarization model. Specifically, given a training dataset comprising document samples and corresponding reference summaries, the base summarization model may be trained on the full training dataset. The "expert" model may be fine-tuned starting with the trained base model using a filtered subset of the training dataset which includes only clean data, e.g., document samples and reference summaries without factual errors. The "anti-expert" model may be fine-tuned starting with the trained base model using a filtered subset of the training data set which includes only noisy data, e.g., document samples and reference summaries with factual errors.

The final summarization model with ensembled parameters from the three trained/fine-tuned models may produce summaries with fewer factual errors.

In some embodiments, parameters may be ensembled using fewer models, for example ensembling parameters of a base model with only an "anti-expert" model.

In one embodiment, to ensemble the final model, the base model may be modified by the anti-expert model by subtracting the anti-expert model parameters from the base model parameters in order to produce a model that produces fewer factual errors.

In another embodiment, the base model may be modified by both the expert and anti-expert models by combining their parameters in order to produce a model that produces fewer factual errors.

The general CaPE framework may also improve computational efficiency of computers, other hardware components and/or other systems at which the CaPE framework is implemented in a variety of ways. By using all samples available in a training dataset, CaPE can take full advantage of a computer's total computing power and memory. Generally, to improve factual consistency of a summarization model, one may spend significant time on data collection, data clean up or data removal. On the other hand, by using noisy samples rather than discarding them, a computer may produce a more accurate model using fewer total samples in a training dataset, resulting in less memory and/or network resources for collecting, storing and communicating large training data. Improved use of training data may also reduce the amount of time required to train a model, resulting in less power and compute resources required.

FIG. 1 is a schematic diagram of a method for building a model according to some aspects of the present disclosure. Training dataset 102 includes a number of text documents and corresponding summaries. As shown in FIG. 1, a base model 104, an expert model 106 (which may be optional as illustrated in dashed lines) and an anti-expert model 108 (which may be optional as illustrated in dashed lines) may receive and be trained with at least part of the training data 102 to ensemble the final mixture of factual experts (MoFE) 110.

The quality of the data in training dataset 102 varies from clean to noisy. This may be quantified, for example, by a factual metric such as entity overlap and/or dependency arc entailment (DAE). Entity overlap evaluates the number of entities in the summary that are absent from the source document and can be used as a direct measure of extrinsic hallucination. A score may be generated based on an entity overlap metric, which represents the percentage of entities in a summary which are not in the source document. Intrinsic hallucination, on the other hand, is broader and includes errors such as incorrect predicates or their arguments, coreference errors, discourse link errors, etc. DAE accuracy measures whether the semantic relationship manifested by individual dependency arcs in the generated output is supported by the input. For example, a score based on a DAE metric may represent a percentage of dependency arcs in a summary which are determined to be factual based on the source document. DAE is a reasonable proxy for measuring intrinsic hallucinations. In one embodiment, both metrics may be used to select noisy data samples. For the entity overlap metric, noisy samples with entity precision below a predetermined threshold are selected. For the DAE metric, noisy samples with the number of DAE errors above a predetermined threshold are selected. Other factual metrics may be utilized to produce similar results.

The base model 104 may be trained using the complete training dataset 102, for example using a maximum likelihood (MLE) training method which maximizes the likelihood of a reference summary given its source document. Training dataset 102 may be filtered based on a factual metric such as DAE or entity overlap, to produce a noisy subset of the training dataset 102. The noisy subset may be used to further train (i.e., fine-tune) the base model 104 to produce anti-expert model 108. In another embodiment, training dataset 102 may also be filtered to produce a clean subset of the training dataset 102. The clean subset may be used to fine-tune the base model 104 to produce an expert model 106.

For the noisy training dataset which generates the anti-expert model, a factual metric such as DAE or entity overlap is used to select noisy data samples that contain factual errors. Each data sample is a combination of a document and corresponding summary. In some embodiments, a score is determined for each data sample based on the factual metric. In some embodiments, the training system performs the scoring step, in other embodiments, the training dataset 102 as provided to the system includes score for each data sample. This score can be used to select noisy data samples which meet a predetermined threshold based on the factual metric which may be, for example, entity overlap or dependency arc entailment (DAE). For example, DAE may be computed by measuring whether the semantic relationship manifested by individual dependency arcs in the summary is supported by the input. Entity overlap may be computed by evaluating the number of entities in the summary that are absent from the source document. In some embodiments, a predetermined threshold may not be used, as described below.

A factual metric may be used to select clean data samples without any factual errors, or with relatively fewer factual errors. A score may be determined for each data sample based on the factual metric. This score may be used to select the clean data samples that meet a predetermined threshold. Depending on the factual metric used, the clean samples may be those below a threshold, or above a threshold. In some embodiments, the factual metric may indicate certain samples as completely clean, and the clean dataset may be selected only from those completely clean document/summary pairs.

In some embodiments, the number of noisy data samples selected may be equivalent to the number of clean data samples selected. For example, if N data samples met a predetermined threshold of a factual metric, and were selected for the clean training dataset, then the noisiest N data samples (based on some factual metric, which may or may not be the same as the one used for selecting the clean training dataset) may be selected for the noisy training dataset. In another embodiment, the data selected for the noisy training dataset includes all of the data above/below a predetermined threshold score regardless of the number of clean data selected for the clean training dataset.

In one embodiment, to ensemble final parameters for the MoFE, parameters of the anti-expert model ($\theta_{\bar{E}}$) may be subtracted from the parameters of the base model ($\theta_B$) to generate a final summarization model ($\theta_{Final}$) The anti-expert parameters may be scaled by a mixing coefficient $\alpha$ which balances factual quality with other aspects of summarization such as ROUGE and information recall. In some embodiments, the base model may be scaled, for example by a value of $(1+\alpha)$ in order to balance the parameter values based on the scaling of the anti-expert model parameters. The final summarization model follows the equation below:

$$\theta_{Final} = (1+\alpha)\theta_B - \alpha(\theta_{\bar{E}})$$

In another embodiment, parameters of the expert model ($\theta_E$) are combined with parameters of the base model. The expert parameters are scaled by a mixing coefficient which balances factual quality with other aspects of summarization such as ROUGE and information recall. In some embodiments, the base model may be scaled, for example by a value of $(1-\alpha)$ in order to balance the parameter values based on the scaling of the expert model parameters. The final summarization model in such an embodiment follows the equation below:

$$\theta_{Final} = (1-\alpha)\theta_B + \alpha(\theta_E)$$

In another embodiment, parameters of the anti-expert model are subtracted from the parameters of the expert model and combined with the parameters of the base model to generate a final summarization model known as the CaPE model ($\theta_{CaPE}$). The combined anti-expert and expert parameters may be scaled by a mixing coefficient which balances factual quality with other aspects of summarization such as ROUGE and information recall. In some embodiments, the scaling may be performed on the difference of the parameters as shown in the equation below. In other embodiments, the expert and anti-expert model parameters may be scaled with different parameters before subtracting. When the expert and anti-expert model parameters are scaled differently, a scaling factor may be applied to the base model in order to balance the parameter values as discussed above with reference to embodiments with only the expert or anti-expert model. The final summarization model in an embodiment where a single mixing coefficient $\alpha$ is used follows the equation below. As the parameters of the expert and anti-expert models are subtracted from each other, we call this contrastive parameter ensembling (CaPE):

$$\theta_{CaPE} = \theta_B + \alpha(\theta_E - \theta\overline{E})$$

Final summarization models described herein, when given a document as an input, may produce an abstractive summary of the document. The abstractive summary produced by the summarization model may have fewer hallucinations than the base model and may provide improvements in factual quality over other models for abstractive summarization.

Some embodiments of summarization models described herein may use training datasets XSUM and/or CNN/DM. Both XSUM and CNN/DM are datasets used in the industry for evaluation of abstractive summarization systems. XSUM and CNN/DM include news article documents which cover a wide variety of domains, accompanied with corresponding summaries.

Computer and Network Environment

Figure 2:
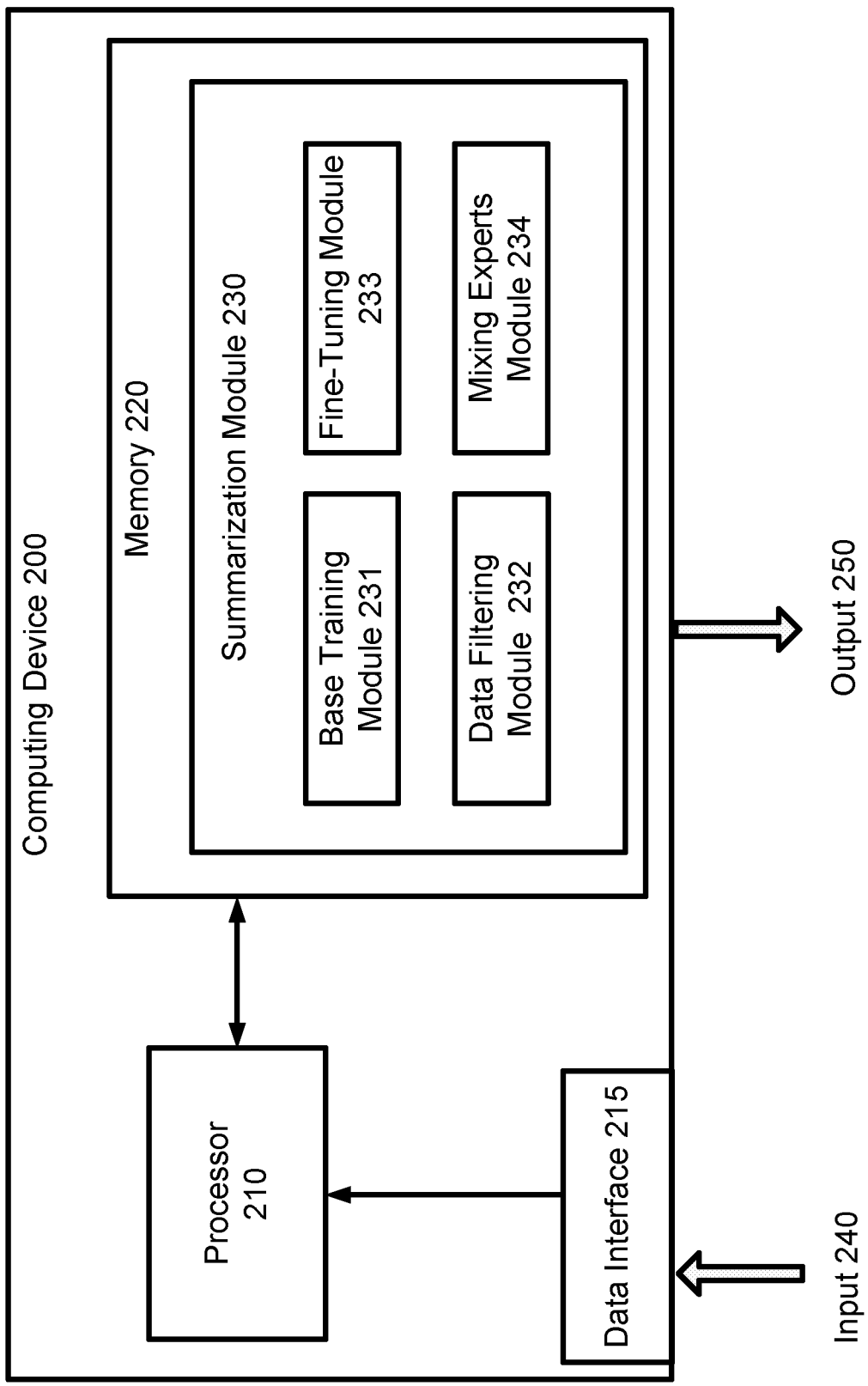
FIG. 2 is a simplified diagram illustrating a computing device implementing the abstractive summarization described in FIG. 1, according to one embodiment described herein.

FIG. 2 is a simplified diagram illustrating a computing device implementing the document summarization described in FIG. 1, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for Summarization module 230 that may be used to implement and/or emulate the systems and models, and/or to implement any of the methods described further herein. A Summarization module 230 may receive input 240 such as an input training data (e.g., XSUM dataset, CNN/DM dataset) via the data interface 215 and generate an output 250 which may be a final summarization model. Examples of the input data may include a set of documents with corresponding summaries. Examples of the output data may include a document summarization model, or at inference, a summary of a document.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as a document, from a user via the user interface.

In some embodiments, the Summarization module 230 is configured to perform document summarization as shown in FIG. 1. The Summarization module 230 may further include a Base Training module 231, a Data Filtering module 232, a Fine-Tuning module 233, and a Mixing Experts module 234 (e.g., similar to the diagram in FIG. 1). In one embodiment, the Summarization module 230 and its submodules 231-234 may be implemented by hardware, software and/or a combination thereof.

Base Training module 231 contains base model 104 and may be configured to train base model 104 on a training dataset 102 received as input 240. Data Filtering module 232 may be configured to filter training data based on a factual metric to produce, for example, a noisy training dataset, a clean training dataset, or both. Fine-Tuning module 233 contains expert model 106 and anti-expert model 108. Fine-Tuning module 233 may be configured to produce anti-expert model 108 by training (i.e., fine tuning) base model 104 on the noisy training dataset, or to produce expert model 106 by training (i.e., fine tuning) base model 104 on the clean training dataset, or both. Mixing Experts module 234 may be configured to combine parameters from the expert, anti-expert, and base models in various combinations as described in the equations above.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
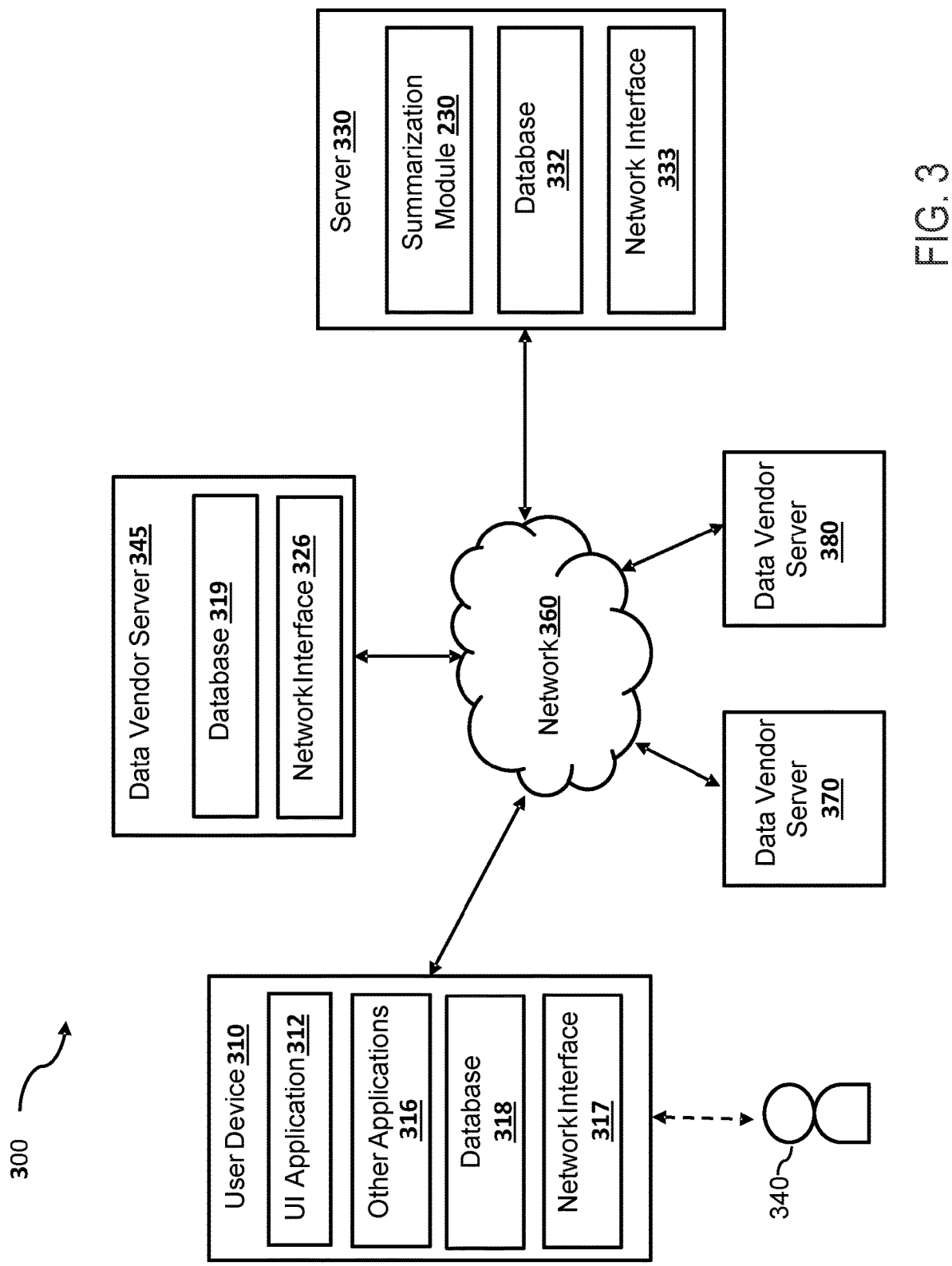
FIG. 3 is a simplified block diagram of a networked system suitable for implementing the abstractive summarization framework described in FIGS. 1-2 and other embodiments described herein.

FIG. 3 provides a simplified block diagram of a networked system suitable for implementing the Summarization framework described in FIGS. 1-2 and other embodiments described herein. In one embodiment, block diagram 300 shows a system including the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view a summary from the summarization model.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including XSUM and CNN/DM to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the Summarization module 230 and its submodules described in FIG. 2. In some implementations, Summarization module 230 may receive data from database 319 at the data vendor server 345 via the network 360 to generate a summarization model. The generated summarization model may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the Summarization module 230. In one implementation, the database 332 may store previously generated summarization models, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370, or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Workflows

Figure 4B:
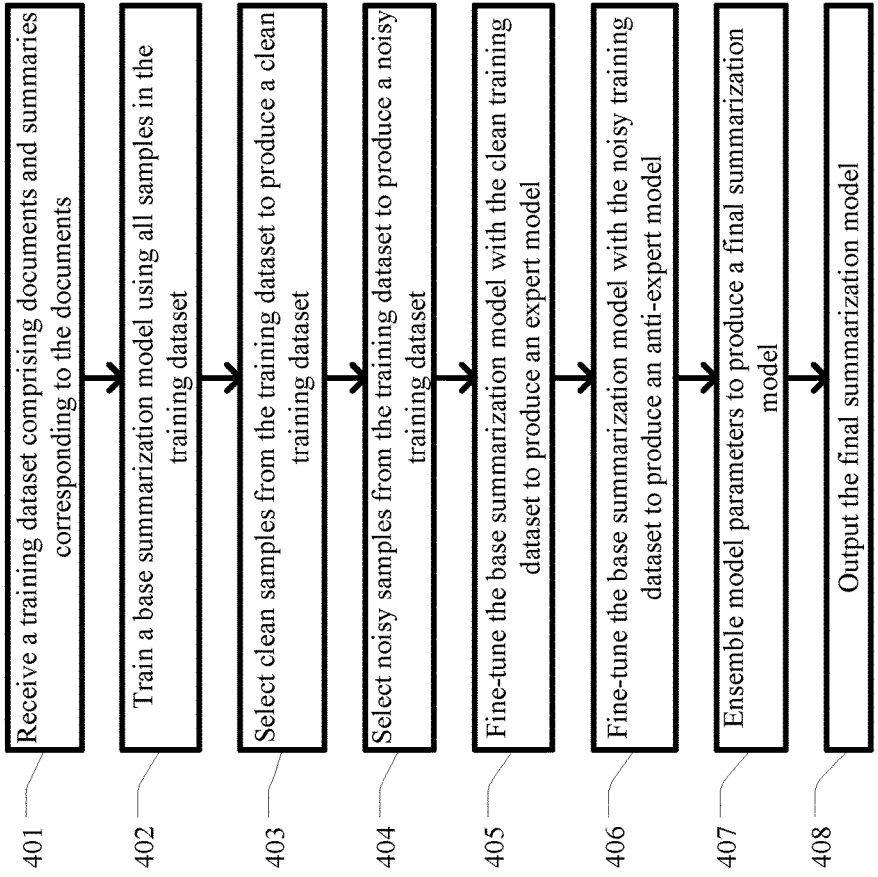
FIG. 4B provides an example logic flow diagram illustrating an example algorithm for training a document summarization system, according to some embodiments.
Figure 4A:
FIG. 4A provides an example pseudo-code illustrating an example algorithm for training a document summarization system, according to some embodiments.

FIG. 4A provides an example pseudo-code segment illustrating an example algorithm 400 for a method of CaPE Summarization based on the framework shown in FIGS. 1-3. FIG. 4B provides an example logic flow diagram illustrating a method of a CaPE Summarization according to the algorithm 400 in FIG. 4A, according to some embodiments described herein. One or more of the processes of method 450 may be implemented, at least in part, in the form of executable code stored on non-transitory, tangible, machine-readable media that when run by one or more processors may cause the one or more processors to perform one or more of the processes. In some embodiments, method 450 corresponds to an example operation of the Summarization module 230 (e.g., FIG. 2) that performs CaPE Summarization.

At step 401, a system receives a training dataset comprising documents and summaries corresponding to the documents. The training dataset may be retrieved from a local memory, from a remote server, or by some other method.

At step 402, a base summarization model is trained using all samples in the training dataset. A training dataset may include text-based documents with corresponding summaries, for example, the XSUM and/or the CNN/DM training datasets.

At step 403, clean samples that meet a predetermined threshold using a factual metric may be selected to produce a clean training dataset. For example, in some embodiments, a predetermined threshold could require a sample to be 100% clean as determined by the factual metric. In other embodiments, a predetermined threshold could allow a sample to be some level of noisy and still meet the threshold. In some embodiments, a factual metric may include at least one of entity overlap or dependency arc entailment. Depending on the factual metric used, what is considered a clean sample may be above a threshold, or below a threshold respectively.

At step 404, noisy samples that meet a predetermined threshold using a factual metric are selected to produce a noisy training dataset. The predetermined threshold using a factual metric may be vary in different embodiments. For example, in some embodiments, a predetermined threshold could require a sample to be highly noisy as determined by the factual metric. In other embodiments, a predetermined threshold could allow a sample to be some level of clean and still meet the threshold. In some embodiments, the number of noisy samples selected may be equivalent to the number of clean samples selected. In some embodiments, a factual metric may include at least one of entity overlap or dependency arc entailment. In some embodiments, the factual metric used to select noisy samples may be the same factual metric used to select clean samples. In other embodiments, the factual metric used to select noisy samples may be different from the factual metric used to select clean samples.

At step 405, the base summarization model can be further trained (i.e., fine-tuned) using the clean training dataset from step 403 to produce an expert model. In some embodiments, it is not necessary to produce or use an expert summarization model. For example, benefits may be realized by ensembling the base summarization model only with an anti-expert summarization model, obviating the need for training an expert summarization model, and in some embodiments, even from selecting a clean training dataset.

At step 406, the base summarization model is further trained (i.e., fine-tuned) using the noisy training dataset from step 404 to produce an anti-expert model. Both the expert and anti-expert model may retain aspects such as ROUGE and information recall of the base summarization model, and may differ in factual qualities.

At step 407, parameters of the base model and at least one of the expert and anti-expert models are combined (ensembled) to produce a final summarization model. In some embodiments, parameters of the anti-expert model are subtracted from the parameters of the base summarization to produce a final summarization model. In some embodiments, parameters of the expert model are added to the parameters of the base summarization model in addition to the parameters of the anti-expert model being subtracted from the base summarization model. In some embodiments, all of the parameters are scaled using respective mixing coefficients which balance factual quality with other aspects of summarization such as ROUGE and information recall. In some embodiments, mixing coefficients can be set at higher values, achieving higher factual consistency at the cost of reduced ROUGE and information recall.

At step 408, a final summarization model is returned as an output. In various embodiments, the final summarization model is stored in a database as described in FIG. 3. In other embodiments, the final summarization model may be sent to a user device for use or for review by a user via a network.

FIGS. 5-13 show provide example charts and tables illustrating example performance of different summarization models discussed herein. For FIGS. 5-13, an expert model for the DAE error metric ($Exp_{DAE}$) and an anti-expert model for the DAE error metric ($Anti_{DAE}$) are trained. An expert model for entity token overlap precision ($Exp_{E-P}$) and an anti-expert model for entity token overlap precision ($Anti_{E-P}$) are trained. Four variants of CaPE are evaluated. $CaPE_{PP}$ uses $Exp_{E-P}$ and $Anti_{E-P}$, $CaPE_{DP}$ uses $Exp_{DAE}$ and $Anti_{E-P}$, and likewise.

For FIGS. 5-13, the following variables are used: $D_{arc}$ measures the percentage of dependency arcs in summary that are entailed by the source article. $D_{sum}$ measures the percentage of summaries that do not have any dependency arc error. $E-P_{src}$ measures the percentage of entities in summary that are present in the source article. $E-R_{ref}$ measures the percentage of entities in reference that are also present in the generated summary. BS-P (R) represents the BERTScore precision (recall) w.r.t. the source article described in Zhang et al., arXiv preprint arXiv:1904.09675, 2019. QEval represents a QA-based factual consistency metric described in Scialom et al., arXiv preprint arXiv:2103.12693, 2021. MNLI measures the entailment score based on the RoBERTa large (described in Liu et al., arXiv preprint arXiv:1907.11692, 2019) model trained on MNLI dataset described in Williams et al., arXiv preprint arXiv:1704.05426, 2018. QAFactEval represents a QA-based factual consistency metric that improves question filtering and answer overlap components described in Fabbri et al., arXiv preprint arXiv:2112.08542v2, 2021).

FIG. 5 provides an example table illustrating validation performance comparison of BART models trained on all and filtered the XSUM dataset. The table shows ROUGE (R-1/2/L) and named entity recall ($E-R_{ref}$) scores of a BART model (described in Lewis et al., arXiv preprint arXiv:1910.13461, 2019) trained on the entity precision-filtered XSUM data (24.6% of the original data). The new model drops 8-18% in ROUGE and 20% drop in entity recall.

FIG. 6 provides an example table illustrating performance comparison of CaPE and baseline models on XSUM and CNN/DM datasets. $CaPE_{DP*}$ is a variant of $CaPE_{DP}$ with $\alpha$ set to 1.0. TT (IT) represents training (inference) time relative to the base model. The table illustrates that ensembling multiple summarization models improves ROUGE scores, BERTScore recall and entity recall, but not necessarily factual consistency metrics. On the other hand, all variants of CaPE outperform the base as well as ensemble across all factual consistency metrics on both the XSUM and CNN/DM datasets. Given the controllability achieved by $\alpha$, the table shows that all variants of CaPE preserve ROUGE scores and information recall within a predefined threshold of maximum 1% drop from the base model. CaPE models also improve BERTScore precision (BS-P) with respect to the source article on both XSUM and CNN/DM.

FIG. 7 provides an example table illustrating performance comparison of $CaPE_{DP}$ (the variant of CaPE which may provide the best trade-off) base and PP-clean models using two additional metrics, QAFactEval and MNLI. As noted by Fabbri et al. (2021), prior studies comparing factual metrics draw inconsistent conclusions, with a few observing QA-based metrics as superior to entailment metrics (described in Durmus et al., arXiv preprint arXiv:2005.03754, 2020; Scialom et al., 2021) and others reporting the opposite (described in Maynez et al., arXiv preprint arXiv:2005.00661, 2020). On both metrics, $CaPE_{DP}$ outperforms both base and PP-clean models, improving the QAFactEval score by 4.8% and 1.14% over base model on XSUM and CNN/DM, respectively.

FIG. 8 provides an example table illustrating performance comparison of individual expert and anti-expert models on DAE- and entity-based metrics on the XSUM and CNN/DM datasets. The table shows that expert models reduce hallucinations in generated summaries. All experts, except the entity-based expert ($Exp_{E-P}$) on CNN/DM, are able to achieve improved performance on the metric used for selecting the training data subset. The table shows that anti-expert models increase hallucinations in generated summaries. All anti-expert models reduce performance on factual consistency metrics for both the XSUM and CNN/DM datasets, with the maximum drop seen on summary level $D_{sum}$ metric, indicating that a greater proportion of anti-expert generated summaries are hallucinated. At the same time, anti-expert models generate well-formed summaries, as indicated by their maintained ROUGE scores.

Figure 9:
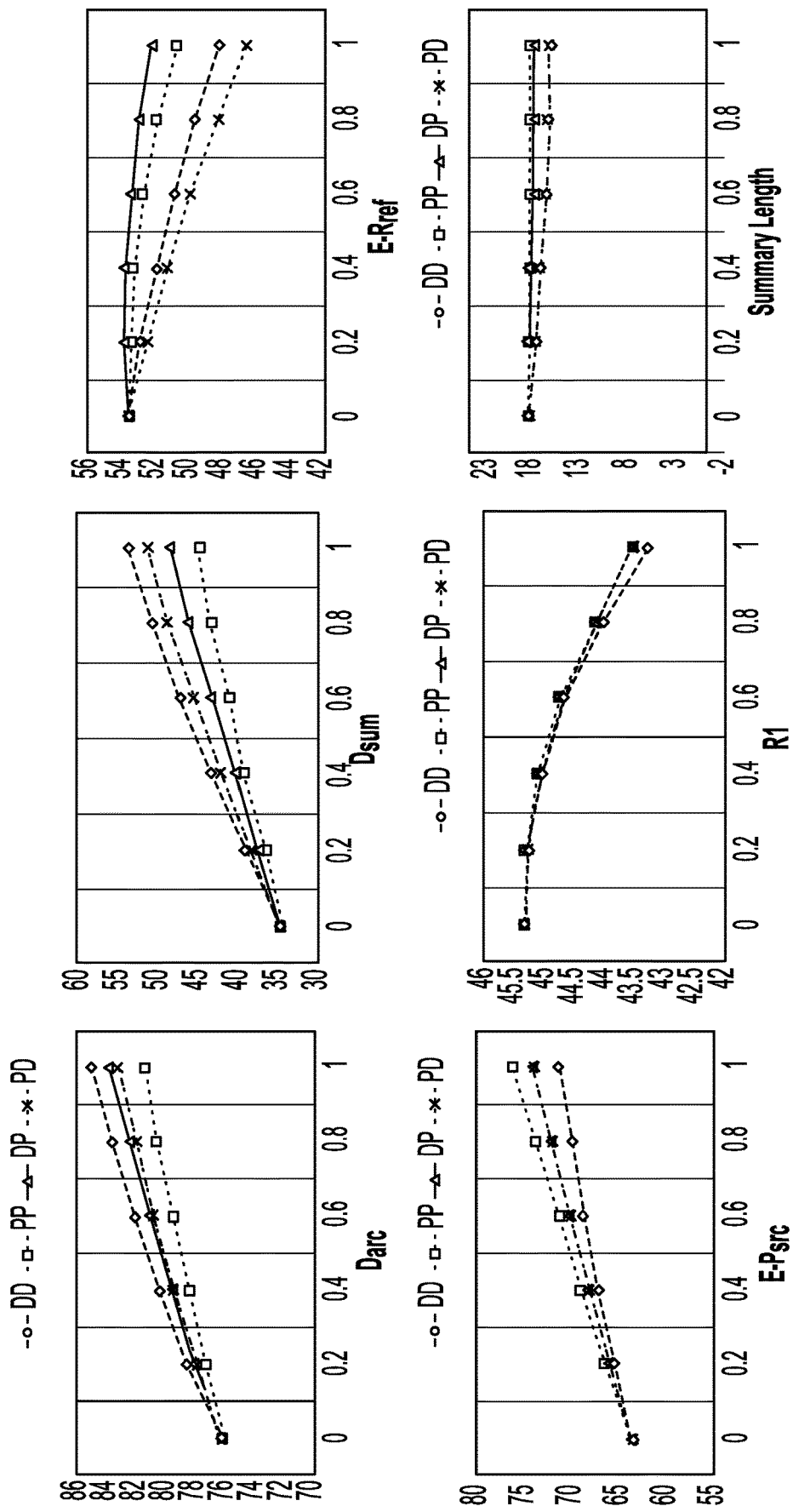
FIG. 9 provides charts illustrating performance variations of different summarization models with different values of mixing coefficients on a training dataset.

FIG. 9 provides example charts illustrating variations in performance of CaPE and base models with different values of mixing coefficient $\alpha$ on XSUM data ($\alpha=0.0$ corresponds to only base model). The expert and anti-expert models pair with the base model using different mixing coefficients and plot their performance on the XSUM and CNN/DM datasets. The charts indicate that inter-mixing the expert and anti-expert based on different metrics may provide the best performance trade-offs. $CaPE_{DD}$, which uses the DAE-based expert and anti-expert, improves $D_{arc}/D_{summ}$ accuracy at the fastest rate on both datasets. Likewise, $CaPE_{PP}$ improves entity precision, $E-P_{src}$, at the fastest rate. $CaPE_{DP}$ and $CaPE_{PD}$ models that inter-mix the expert and anti-expert based on different metrics may provide the best bargain on all factual consistency metrics, evenly improving all $D_{arc}/D_{sum}$ and $E-P_{src}$ scores. Overall, $CaPE_{DP}$ may provide the best balance for all performance measures on both datasets.

FIG. 10 provides an example table illustrating average summary lengths of data used for training the base, expert, and anti-expert models. $CaPE_{DD/DP}$ models see a maximum increase in the summary length on the CNN/DM dataset, which is confounded with the higher average summary length of data used for training the $Exp_{DAE}$ expert. Similarly, on XSUM data, $CaPE_{DD/PD}$ models have a relatively lower average size than other models, which can be explained by the higher average summary length of samples used for training the $Anti_{DAE}$ anti-expert (longer summaries for anti-expert training makes CaPE generate shorter summaries).

Figure 11:
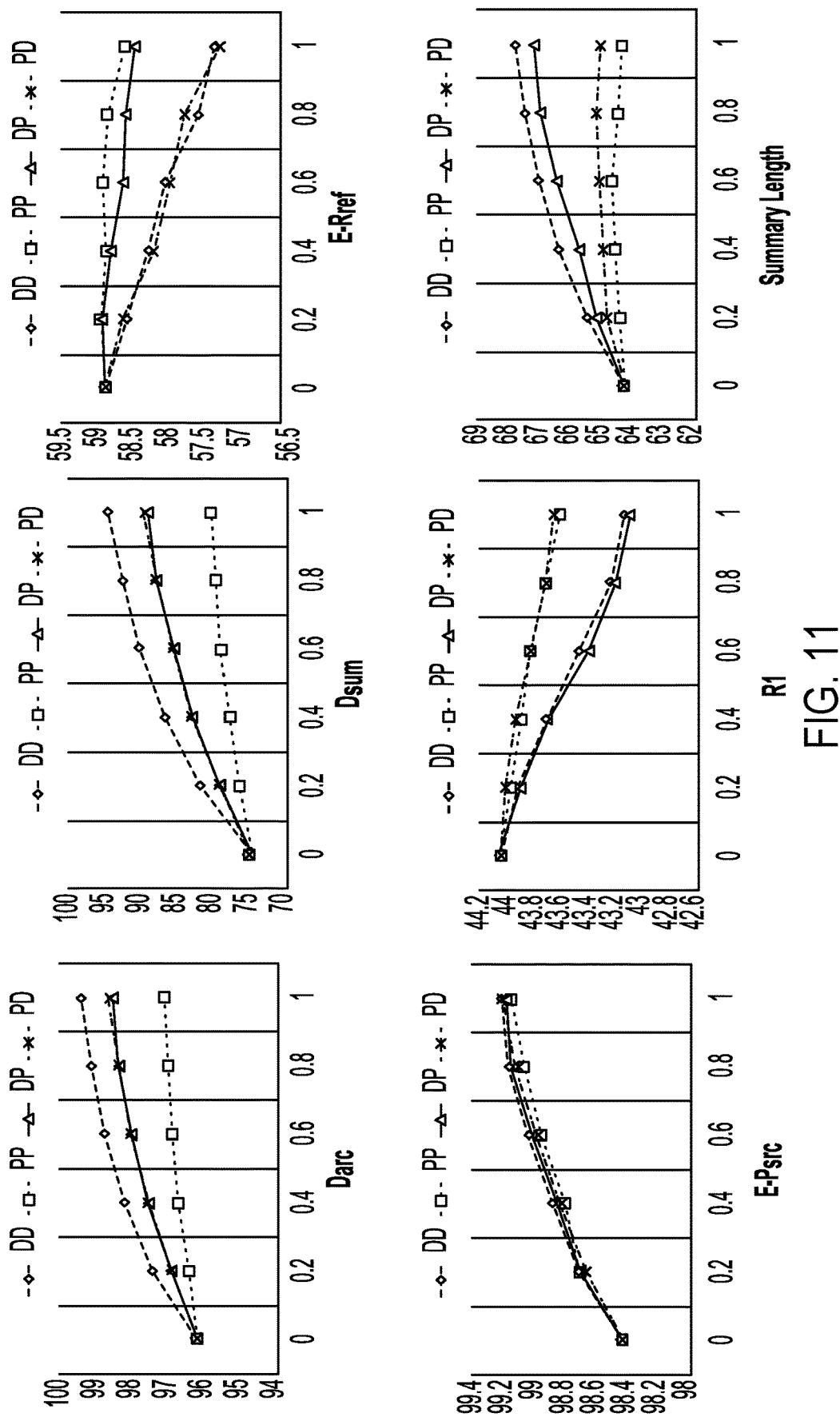
FIGS. 11-13 provide example charts illustrating performance comparisons of different summarization models discussed herein.

FIG. 11 provides example charts illustrating variations in performance of CaPE and base models with different values of mixing coefficient $\alpha$ on CNN/DM data ($\alpha=0.0$ corresponds to only base model). The expert and anti-expert models pair with the base model using different mixing coefficients and plot their performance on the XSUM and CNN/DM datasets. The charts indicate that inter-mixing the expert and anti-expert based on different metrics may provide the best performance trade-offs. $CaPE_{DD}$, which uses the DAE-based expert and anti-expert, improves $D_{arc}/D_{summ}$ accuracy at the fastest rate on both datasets. Likewise, $CaPE_{PP}$ improves entity precision, E P at the fastest rate. $CaPE_{DP}$ and $CaPE_{PD}$ models that inter-mix the expert and anti-expert based on different metrics may provide the best bargain on all factual consistency metrics, evenly improving all $D_{arc}/D_{sum}$ and $E\text{-}P_{src}$ scores. Overall, $CaPE_{DP}$ may provide the best balance for all performance measures on both datasets.

Figure 12:
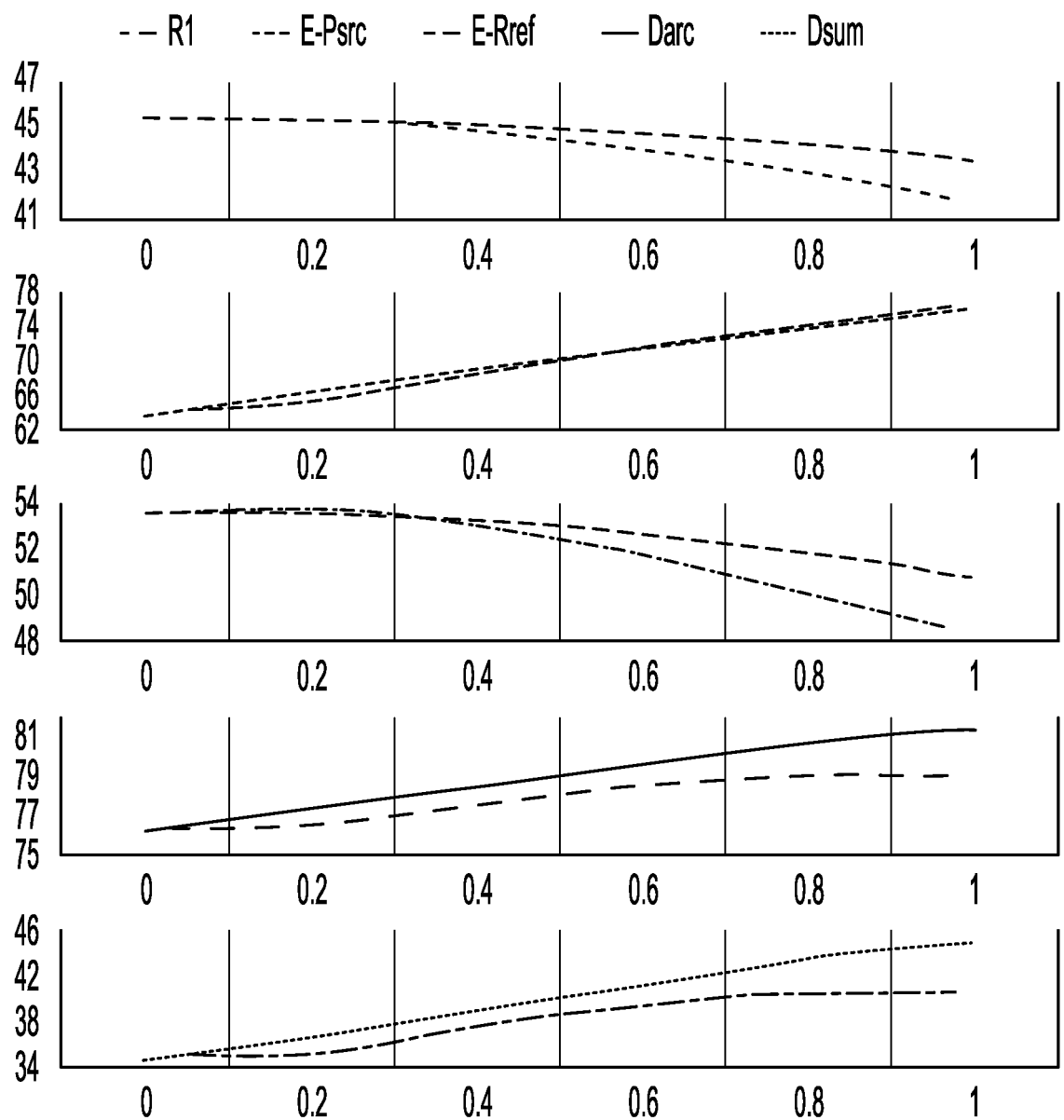

FIG. 12 provides example charts illustrating performance comparison of models obtained by fine-tuning base summarization model (solid) vs training BART model (dashed) based on data selected according to the entity precision metric. The charts indicate that both models improve performance on all factual consistency metrics. On the $E\text{-}P_{src}$ metric, which was also used to select the training samples, both models obtain comparable improvement. However, on the DAE-based factual consistency metrics as well as ROUGE and $E\text{-}R_{ref}$ metrics, fine-tuning the base model outperforms the one based on training BART. The gap in performance increases with the increase in value of α, i.e., when the influence of expert (anti-expert) increases.

Figure 13:
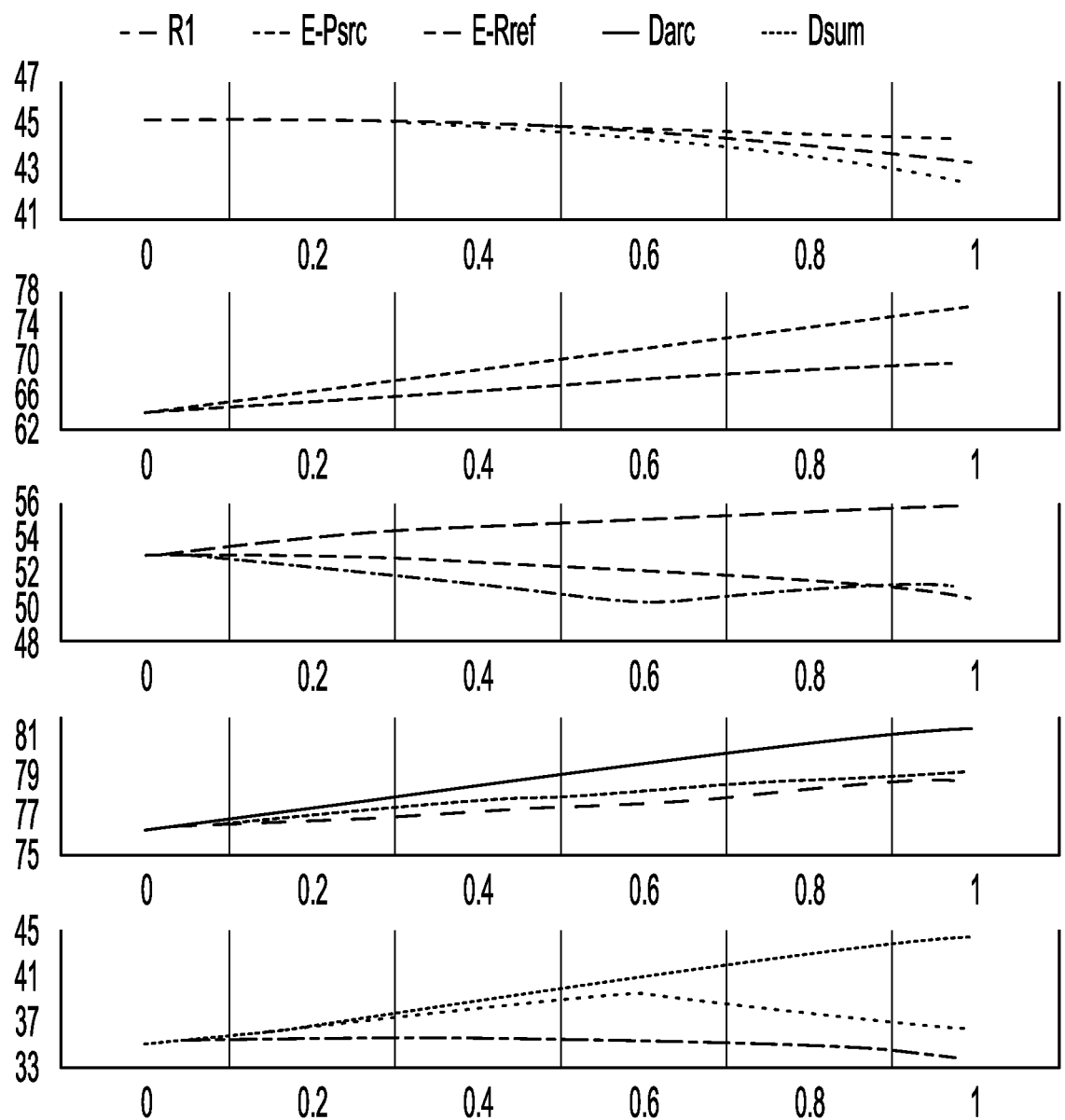

FIG. 13 provides example charts illustrating performance comparison of CaPE (solid), expert only (dashed), anti-expert only (dotted) models based on data selected according to the entity precision metric. The expert model is equivalent to WiSE-FT model. Performance variations for the three models indicate that the contrastive ensembling combines the gains from expert and anti-expert, helping to effectively use both clean and noisy data.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for training a summarization model, the method comprising:
receiving a training dataset, the training dataset comprising a plurality of documents and a plurality of summaries corresponding to the plurality of documents;
updating parameters of a base summarization model based on a first training objective comparing summaries generated by the base summarization model and corresponding summaries from the training dataset;
filtering the training dataset using a first factual metric to provide a noisy training dataset having at least one summary including factual errors compared to a corresponding document based on the first factual metric;
generating an anti-expert summarization model by updating parameters of the base summarization model based on a second training objective comparing summaries generated by the base summarization model and corresponding summaries from the noisy training dataset;
generating a final summarization model based at least in part on parameters computed by subtracting weights of the anti-expert summarization model from weights of the base summarization model;
receiving, via a user interface, a user input document; and
automatically generating, by the generated final summarization model, an output summary presented at the user interface in response to the user input document.

2. The method of claim 1, wherein the first factual metric used to provide the noisy training dataset is at least one of entity overlap or dependency arc entailment (DAE).

3. The method of claim 1, wherein the filtering the training dataset using the first factual metric to provide a noisy training dataset comprises:
determining a score for each document and corresponding summary based on the first factual metric; and
using the score to select those which meet a predetermined threshold.

4. The method of claim 1, wherein the parameters of the base summarization model and parameters of the anti-expert summarization model are scaled using respective mixing coefficients.

5. The method of claim 1, further comprising:
filtering the training dataset using a second factual metric to provide a clean training dataset; and
generating an expert summarization model by updating parameters of the base summarization model based on comparing summaries generated by the base summarization model and corresponding summaries from the clean training dataset;
wherein generating the final summarization model is further based on parameters computed by adding parameters of the expert summarization model to the parameters of the base summarization model.

6. The method of claim 5, wherein the filtering the training dataset using a second factual metric to provide a clean training dataset comprises:
determining a score for each document and corresponding summary based on the second factual metric; and
using the score to select those which meet a predetermined threshold, wherein a quantity of samples of the noisy training dataset is equivalent to a quantity of samples of the clean training dataset.

7. The method of claim 5, wherein the parameters of the base summarization model, the parameters of the expert summarization model, and the parameters of the anti-expert summarization model are scaled using respective mixing coefficients.

8. A system for training a summarization model, the system comprising:
a memory that stores a summarization model and a plurality of processor executable instructions;
a communication interface that receives a training dataset, the training dataset comprising a plurality of documents and a plurality of summaries corresponding to the plurality of documents; and one or more hardware processors that read and execute the plurality of processor-executable instructions from the memory to perform operations comprising:

updating parameters of a base summarization model based on a first training objective comparing summaries generated by the base summarization model and corresponding summaries from the training dataset;

filtering the training dataset using a first factual metric to provide a noisy training dataset having at least one summary including factual errors compared to a corresponding document based on the first factual metric;

generating an anti-expert summarization model by updating parameters of the base summarization model based on a second training objective comparing summaries generated by the base summarization model and corresponding summaries from the noisy training dataset;

generating the summarization model based at least in part on parameters computed by subtracting weights of the anti-expert summarization model from weights of the base summarization model;

receiving, via a user interface, a user input document; and automatically generating, by the summarization model, an output summary presented at the user interface in response to the user input document.

9. The system of claim 8, wherein the first factual metric used to provide the noisy training dataset is at least one of entity overlap or dependency arc entailment (DAE).

10. The system of claim 8, wherein an operation of filtering the training dataset using the first factual metric to provide a noisy training dataset comprises:

determining a score for each document and corresponding summary based on the first factual metric; and using the score to select those which meet a predetermined threshold.

11. The system of claim 8, wherein the parameters of the base summarization model and parameters of the anti-expert summarization model are scaled using respective mixing coefficients.

12. The system of claim 8, wherein the operations further comprise:

filtering the training dataset using a second factual metric to provide a clean training dataset;

generating an expert summarization model by updating parameters of the base summarization model based on comparing summaries generated by the base summarization model and corresponding summaries from the clean training dataset; and generating the summarization model further based on parameters computed by adding parameters of the expert summarization model to the parameters of the base summarization model.

13. The system of claim 12, wherein an operation of filtering the training dataset using a second factual metric to provide a clean training dataset comprises:

determining a score for each document and corresponding summary based on the second factual metric; and using the score to select those which meet a predetermined threshold, wherein a quantity of samples of the noisy training dataset is equivalent to a quantity of samples of the clean training dataset.

14. The system of claim 12, wherein the parameters of the base summarization model, the parameters of the expert summarization model, and the parameters of the anti-expert summarization model are scaled using respective mixing coefficients.

15. A non-transitory machine-readable medium comprising a plurality of machine-executable instructions which, when executed by one or more processors, are adapted to cause the one or more processors to perform operations comprising:

receiving a training dataset, the training dataset comprising a plurality of documents and a plurality of summaries corresponding to the plurality of documents;

updating parameters of a base summarization model based on a first training objective comparing summaries generated by the base summarization model and corresponding summaries from the training dataset;

filtering the training dataset using a first factual metric to provide a noisy training dataset having at least one summary including factual errors compared to a corresponding document based on the first factual metric;

generating an anti-expert summarization model by updating parameters of the base summarization model based on a second training objective comparing summaries generated by the base summarization model and corresponding summaries from the noisy training dataset;

generating a final summarization model based at least in part on parameters computed by subtracting weights of the anti-expert summarization model from weights of the base summarization model;

receiving, via a user interface, a user input document; and automatically generating, by the generated final summarization model, an output summary presented at the user interface in response to the user input document.

16. The non-transitory machine-readable medium of claim 15, wherein the first factual metric used to provide the noisy training dataset is at least one of entity overlap or dependency arc entailment (DAE).

17. The non-transitory machine-readable medium of claim 15, wherein an operation of filtering the training dataset using the first factual metric to provide a noisy training dataset comprises:

determining a score for each document and corresponding summary based on the first factual metric; and using the score to select those which meet a predetermined threshold.

18. The non-transitory machine-readable medium of claim 15, wherein the parameters of the base summarization model and parameters of the anti-expert summarization model are scaled using respective mixing coefficients.

19. The non-transitory machine-readable medium of claim 15, wherein the operations further comprise:

filtering the training dataset using a factual metric to provide a clean training dataset; and generating an expert summarization model by updating parameters of the base summarization model based on comparing summaries generated by the base summarization model and corresponding summaries from the clean training dataset;

wherein generating the final summarization model is further based at least in part on parameters computed by adding parameters of the expert summarization model to the parameters of the base summarization model.

20. The non-transitory machine-readable medium of claim 19, wherein the parameters of the base summarization model, the parameters of the expert summarization model, and the parameters of the anti-expert summarization model are scaled using respective mixing coefficients.

* * * * *